(12) United States Patent
Wechlin et al.

(10) Patent No.: US 9,473,211 B2
(45) Date of Patent: Oct. 18, 2016

(54) DEVICE FOR THE INDUCTIVE TRANSMISSION OF ELECTRICAL ENERGY

(75) Inventors: Mathias Wechlin, Kandern (DE); Pascal Asselin, Riedisheim (FR)

(73) Assignee: CONDUCTIX WAMPFLER GMBH, Weil am Rhein (DE)

( * ) Notice: Subject to any disclaimer, the term of this patent is extended or adjusted under 35 U.S.C. 154(b) by 623 days.

(21) Appl. No.: 13/994,458

(22) PCT Filed: Nov. 9, 2011

(86) PCT No.: PCT/EP2011/069764
§ 371 (c)(1),
(2), (4) Date: Aug. 22, 2013

(87) PCT Pub. No.: WO2012/079861
PCT Pub. Date: Jun. 21, 2012

(65) Prior Publication Data
US 2014/0292091 A1   Oct. 2, 2014

(30) Foreign Application Priority Data
Dec. 16, 2010 (DE) .................. 10 2010 054 848

(51) Int. Cl.
*H01F 27/42* (2006.01)
*H01F 37/00* (2006.01)
(Continued)

(52) U.S. Cl.
CPC ........... *H04B 5/0037* (2013.01); *B60L 11/182* (2013.01); *H04B 5/0093* (2013.01); *Y02T 10/7005* (2013.01); *Y02T 10/7072* (2013.01); *Y02T 90/122* (2013.01); *Y02T 90/14* (2013.01)

(58) Field of Classification Search
CPC .......... H02J 5/005; H02J 7/025; H02J 17/00; H02J 7/0052; H02J 7/007; H02J 2007/0059; H02J 2007/0096; H02J 7/0044; H02J 2007/0001; H02J 2007/10; H02J 7/00; H02J 7/0004; H02J 7/0027; H02J 7/0072

USPC ......................................................... 307/104
See application file for complete search history.

(56) References Cited

U.S. PATENT DOCUMENTS 5,814,792 A * 9/1998 Wildi ................. H05B 3/34
                                                     219/213
6,506,971 B1   1/2003 Grach et al.
(Continued)

FOREIGN PATENT DOCUMENTS

DE       2600669 A1    7/1977
DE      10301530 A1    7/2004
(Continued)

OTHER PUBLICATIONS

International Search Report published Jun. 21, 2012 for PCT/EP2011/069764 filed Nov. 9, 2011.
(Continued)

*Primary Examiner* — Jung Kim
*Assistant Examiner* — Esayas Yeshaw
(74) *Attorney, Agent, or Firm* — Paul D. Bianco; Katharine Davis; Fleit Gibbons Gutman Bongini & Bianco PL

(57) ABSTRACT

A device for the inductive transmission of electrical energy having a coil which can be inductively coupled to another coil for energy transmission; a power electronic unit for drawing electrical power from the coil or for outputting electrical power into the coil; and a feedline connecting the coil to the power electronic unit. The feedline includes at least two multi-conductor cables with conductors which are insulated from one another and the connection of each terminal of the coil to a respectively assigned terminal of the power electronic unit includes a plurality of conductors of the multi-conductor cables. Each terminal of the coil is preferably connected to the respectively assigned terminal of the power electronic unit by conductors of at least two different cables and the same number of conductors of each individual cable connect each terminal of the coil to the respectively assigned terminal of the power electronic unit.

8 Claims, 2 Drawing Sheets

(51) Int. Cl.
*H01F 38/00* (2006.01)
*H04B 5/00* (2006.01)
*B60L 11/18* (2006.01)

(56) References Cited

U.S. PATENT DOCUMENTS

| | | | |
|---|---|---|---|
| 6,649,842 B1 | 11/2003 | Nishino | |
| 7,772,495 B2 | 8/2010 | Wu et al. | |
| 2001/0002773 A1 | 6/2001 | Hyogo | |
| 2006/0202704 A1* | 9/2006 | Satou | G01R 15/183 324/546 |
| 2009/0178825 A1 | 7/2009 | Wu et al. | |
| 2010/0019734 A1* | 1/2010 | Oyobe | B60K 6/365 320/162 |
| 2010/0117596 A1* | 5/2010 | Cook | B60L 11/182 320/108 |
| 2011/0031928 A1* | 2/2011 | Soar | F41G 1/34 320/108 |
| 2012/0217111 A1* | 8/2012 | Boys | H01F 38/14 191/10 |

FOREIGN PATENT DOCUMENTS

| | | |
|---|---|---|
| EP | 2081196 A2 | 1/2009 |
| RU | 2025014 C1 | 12/1994 |

OTHER PUBLICATIONS

Written Opinion for PCT/EP2011/069764 filed Nov. 9, 2011.
International Preliminary Report published Jun. 18, 2013 for PCT/EP2011/069764 filed Nov. 9, 2011.
English Translation of Written Opinion published Jun. 16, 2013 for PCT/EP2011/069764 filed Nov. 9, 2011.

* cited by examiner

DEVICE FOR THE INDUCTIVE TRANSMISSION OF ELECTRICAL ENERGY

FIELD OF THE INVENTION

The invention concerns a device for the inductive transmission of electrical energy.

BACKGROUND OF THE INVENTION

For the inductive charging of electric vehicles, the vehicle secondary coil is preferably located on the underside of the vehicle, so that the inductive coupling with the primary coil of a charging station can be brought about by the simple parking of the vehicle on the charging station with a suitable alignment of the secondary coil with a primary coil that is located on the ground. As low as possible a design height of the secondary coil is hereby desirable, since only an installation space of low height is available for its placement on the underside of the vehicle as a rule. The secondary coil must be connected to a vehicle power electronic unit by a feedline, with the unit converting the signal coming from the secondary coil into a form suitable for the charging of the vehicle battery. The feedline must also be placed at least partially on the underside of the vehicle and is therefore subject to the same requirements as the secondary coil, with regard to the design height.

The space available in a vehicle for the placement of the additional components, such as an inductive transmission device, is generally quite limited. Therefore, a low design height of the secondary coil and its feedline is also of interest with an installation site other than the underside, such as in the area of a bumper or a crumple zone.

As a result of the relatively high operating frequency of the inductive transmission distance, which usually lies in the order of magnitude of 20 kHz nowadays and, in the future, could also shift further upward, the skin effect must be taken into consideration in the design of the feedline; it places special demands on the feedline cable. One possible solution is the use of a high frequency litz wire, which consists of a large number of very thin individual wires, insulated from one another by a lacquer layer. This type of cable, however, is relatively expensive, especially in a shielded design, and upon connection of its ends to other components, that is, here to the secondary coil and the power electronic unit, is difficult to work with.

When using a normal cable, a large conductor cross section must be selected because of the large current and the skin effect; this results in a correspondingly large total cross section of the cable. Therefore, the requirement of a feedline with a low design height, especially a design height that is not larger than that of the secondary coil, can hardly be fulfilled with a normal cable.

With a device for the inductive charging of an electric vehicle, a low design height is also desirable for the primary coil and its feedline to the charging station, in particular if the primary coil and its feedline are not lowered to the ground but rather are mounted lying on the surface of a vehicle parking space and thus are potential tripping hazards for the occupants of the vehicle, or if the primary coil is to be designed as a portable unit.

US 2001/0002773 A1 discloses a feedline cable with several conductors, insulated from one another, for the primary coil of a device for the inductive charging of the battery of an electric vehicle. The conductors are insulated from one another so as to conduct, within one single cable with an overall circular cross section, the primary current in both directions between a charging station and a primary coil, designed so it can be carried, so that only one single cable is needed to connect the charging station to the primary coil.

U.S. Pat. No. 6,649,842 B1 shows the connection of an outlet with an electrical energy source by two multi-conductor cables whose conductors can be connected on the ends without welding to the energy source or the outlet. Furthermore, this document teaches the use of ferrite cores for the compensation of the current strengths between the conductors of a multi-conductor cable. To this end, the individual conductors are joined in several stages to form groups of increasing size, and are conducted in each stage, in groups together, through ferrite cores.

U.S. Pat. No. 6,506,971 B1 shows a multi-conductor electric cable in which at least one conductor consists of several partial conductors that are insulated from one another and are connected parallel to one another, and each partial conductor is adjacent to a conductor or a partial conductor that conducts a current flowing in a phase-staggered manner or in the opposite direction, so that the magnetic field outside the cable, which is caused for the most part by the currents flowing in the cable, has as low as possible a field strength.

SUMMARY OF THE INVENTION

The goal of the invention is to provide a simple and low-cost solution, with a device for the inductive transmission of electrical energy for the implementing of a connection with a low height between the coil and a power electronic unit.

This goal is attained, in accordance with the invention by a device described herein. Advantageous developments of the invention are also described herein.

In accordance with the invention, with a generic device for the inductive transmission of electrical energy, the feedline between the coil and the power electronic unit consists of at least two multi-conductor cables with conductors insulated from one another, and the connection of each terminal of the coil with a respectively assigned terminal of the power electronic unit consists of a plurality of conductors of the multi-conductor cables. This makes it possible to use cables with a small total cross section and in this way, on the whole, to maintain a low design height of the feedline. The conductor cross section of the cables, which is too small for the current to be conducted, is compensated by distributing the current among several conductors.

Preferably, each terminal of the coil is connected to the respectively assigned terminal of the power electronic unit by conductors of at least two different cables. In this way, currents flow in each cable with directions opposing one another, whose magnetic fields are consequently directed against one another and therefore compensate each other at least partially. This is advantageous with respect to avoiding disturbances of electronic vehicle components by the magnetic alternating field with a relatively high field strength and frequency proceeding from the feedline. For the compensation effect, it is particularly favorable if the same number of conductors of each individual cable connect each of the two terminals of the coil to the respectively assigned terminal of the power electronic unit.

It is even more favorable for the compensation of the magnetic field if, moreover, the conductors are arranged symmetrically in the cross section of each cable and are assigned to the terminals of the coil in such a way that the conductors with the same current direction are always arranged in pairs and in a manner symmetrical to the center of the cable, and in the circumferential direction on each circle defined by the center of the cable and the centers of two conductors symmetrical to one another, conductors with a current direction opposed to one another alternate. In this case, the magnetic fields of the individual conductors of each cable already, to a large extent, compensate for each other outside the cable at a small distance from the cable, if the magnitudes of the partial currents of all conductors are the same.

Furthermore, it is advantageous if all conductors of the cables that connect a terminal of the coil to the same terminal of the power electronic unit are conducted, for the uniform distribution of the total current, to the individual conductors, cyclically and in pairs, with current directions opposing one another, by closed magnetic cores. A uniform distribution of the total current among the individual conductors is desirable both with regard to the compensation of the magnetic field proceeding from the feedline, as well as in the interest of a low total ohmic resistance of the feedline and avoiding a nonuniform power dissipation and thus a heating of the different conductors.

A sensible reference value for the total cross section of each of the multi-conductor cables is the design height of the coil, which should not be exceeded, so that a space of the same height that the coil takes up is sufficient for the feedline.

BRIEF DESCRIPTION OF THE DRAWINGS

Additional details and advantages of the invention are disclosed by the following description of an embodiment example with the aid of the drawings. The figures in the drawing show the following.

DETAILED DESCRIPTION OF THE INVENTION

Figure 1:
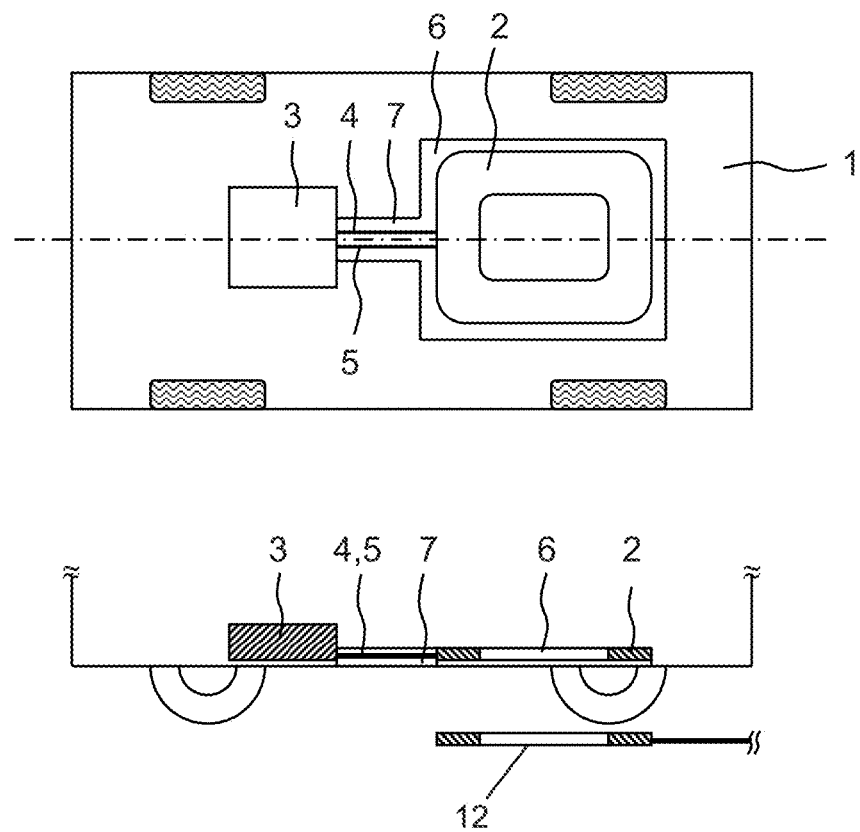
FIG. 1, schematic representations of a vehicle equipped with a device in accordance with the invention, in the view from below and in a partial longitudinal section.

As FIG. 1 shows schematically, a device for the inductive input of electrical energy with secondary coil 2 and a power electronic unit 3 is located on the underside of a vehicle 1; they are connected to one another by a two-pole feedline 4, 5. The power electronic unit 3 is connected to a battery, which is not depicted, from which the electric drive of the vehicle 1 is supplied. The device is used for the charging of the vehicle battery at a charging station that has a primary coil 12 that corresponds to the secondary coil 2. For the charging of the vehicle battery, the vehicle 1 is parked at the charging station in such a way that the secondary coil 2 is suitably aligned with the primary coil 12, located on the ground, and the two coils form a transformer, via which electrical energy can be transmitted to the vehicle 1.

As the partial longitudinal section in FIG. 1 reveals, below, with reference above to the dot-dash line in FIG. 1, the secondary coil 2 is very flat, since only an installation space 6 with a low height is available for it on the underside of the vehicle 1. Channel 7, which leads from the installation space 6 to the power electronic unit 3 and is available for the laying of the feedline 4, 5, also has the same low height. The feedline 4, 5 may therefore not have a cross section greater than the design height of the secondary coil 2, so that it does not protrude downward from the channel 7.

Figure 2:
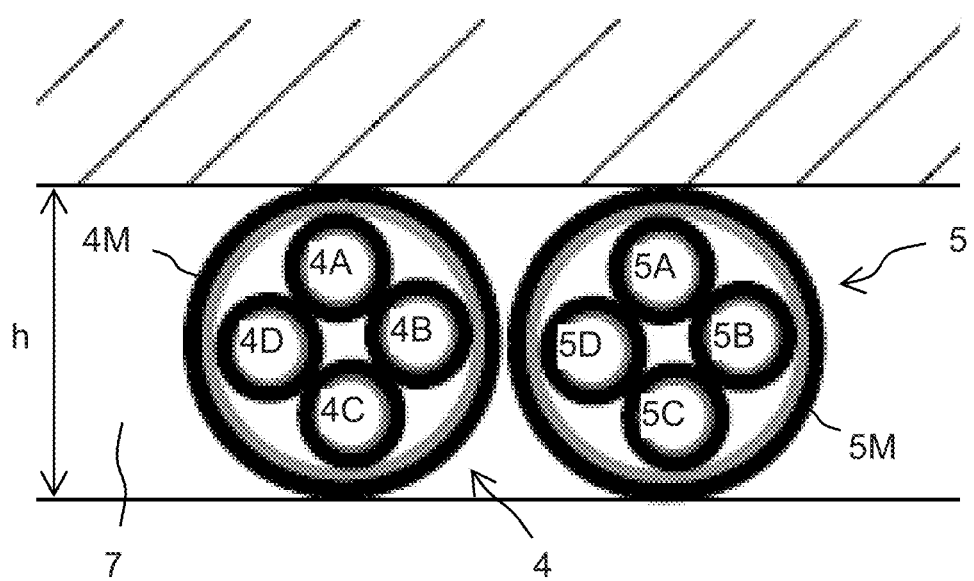
FIG. 2, a configuration in accordance with the invention of two four-conductor cables in cross section.

As is shown to the right in FIG. 2, the feedline 4, 5 in accordance with the invention consists, for example, of two cables 4 and 5, whose respective total cross section corresponds to the height h of channel 7. Each of the cables 4 and 5 has four similar conductors 4A to 4D or 5A to 5D, insulated from one another, so that the current can be distributed in any direction among four conductors. Each individual one of cables 4 and 5 has an overall cross-sectional diametercross section, including the outer jackets 4M and 5M, that corresponds to the height h of the channel 7, so that, with a connection of the secondary coil 2 to the power electronic unit 3 by cables 4 and 5, the height h that is available is precisely maintained.

Figure 3:
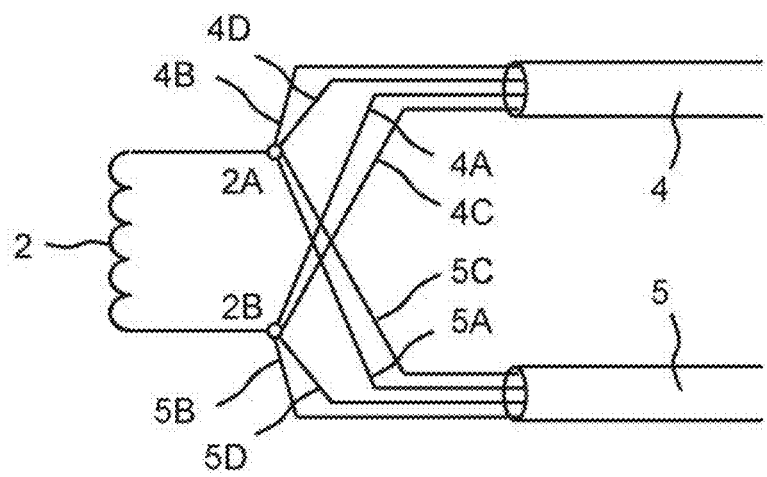
FIG. 3, an example of a terminal of a secondary coil in accordance with the invention on two four-conductor cables.

Although the maintenance of the available height h can already be attained in that the four conductors of the one cable 4 connect a terminal of the secondary coil 2 to a terminal of the power electronic unit 3, and the four conductors of the other cable 5 connect the other terminal of the secondary coil 2 to the other terminal of the power electronic unit 3, it is expedient to use conductors of different cables for the connection of one terminal of the secondary coil 2 to a terminal of the power electronic unit 3, as is shown in FIG. 3. There, two conductors 4B and 4D of cable 4 and two conductors 5A and 5C of cable 5 are connected to a terminal 2A of the secondary coil 2, whereas the two other conductors 4A and 4C of cable 4 and the two other conductors 5B and 5D of cable 5 are connected to the other terminal 2B of the secondary coil 2. The connection to the two terminals of the power electronic unit 3 is produced in a manner which is analogous to this.

In this way, the total current of the circuit is divided by half on the two cables 4 and 5 between the secondary coil 2 and the power electronic unit 3 in each of the two directions, so that, all total, two opposing currents, equally large in magnitude, flow in each of the cables 4 and 5. This results in the magnetic fields caused by the currents outside cables 4 and 5 being approximately mutually compensated and the electromagnetic compatibility of the inductive energy input device with the electronic components of vehicle 1 is improved.

As FIG. 2 shows, the mutual compensation of the magnetic fields can still be improved in that, with a radial-symmetrical arrangement of the conductors 4A-4D and 5A-5D within cables 4 and 5, the assignment of the conductors is selected in such a way that, for example, in cable 4, the conductors 4A and 4C, which conduct a current in one direction, lie symmetrical to the center of the cable cross section, and the conductors 4B and 4D, which conduct a current in the opposite direction, likewise lie symmetrical to the center of the cable cross section on a circle with the same radius. This provides for an extensive compensation of the magnetic fields already at a short distance from cable 4, if the partial currents of all conductors have the same magnitude. With cable 5 also, the assignment of conductors 5A-5D is selected according to the same scheme.

Figure 4:
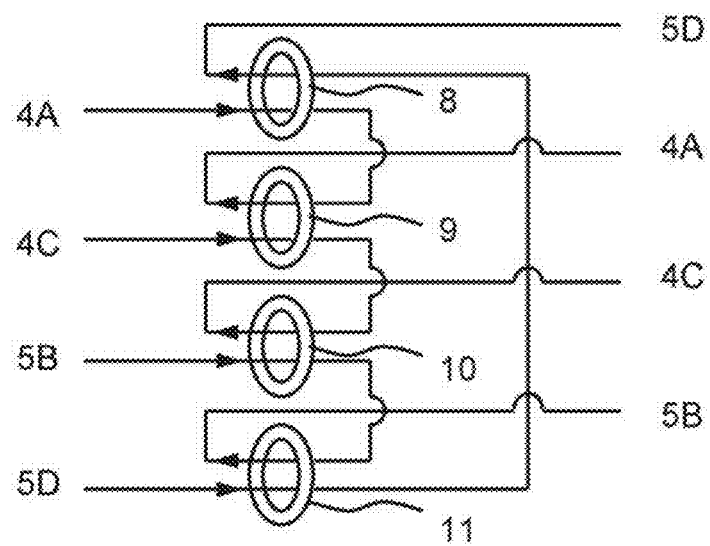
FIG. 4, an arrangement for the symmetrical current distribution among four conductors of a cable.

In order to guarantee the equivalency of the magnitudes of all of the partial currents conducted by the individual conductors 4A-4D and 5A-5D, the conductors that connect a terminal of the secondary coil 2 to the same terminal of the power electronic unit 3 are conducted cyclically and in pairs, with opposite current directions, through closed magnetic cores, as is schematically shown in FIG. 4, with the aid of the conductors 4A, 4C, 5B, and 5D, connected to the terminal 2B of the secondary coil 2. Thus, the conductors 5D and 4A are conducted through the magnetic core 8; the conductors 4A and 4C, through the magnetic core 9; the conductors 4C and 5B, through the magnetic core 10; and the conductors 5B and 5D, through the magnetic core 11. As magnetic cores 8-11, ring cores made of ferrite can be used.

The current directions are indicated in FIG. 4 by respective arrows in the conductors. Thus, for example, in the passage through the magnetic core 8, the conductors 5D and 4A conduct partial currents in opposite directions, although their current direction is the same with reference to the connection of the secondary coil 2 to the power electronic unit 3. This is brought about by the loop-like placement of the conductor 5D through the magnetic core 8, which can be seen in FIG. 4. Whereas the magnetic fields of the conductors 5D and 4A, which are closely adjacent in the passage through the magnetic core 8, approximately compensate each other with the same magnitudes of their partial currents, different magnitudes of their partial currents result in a magnetic alternating field in the magnetic core 8. In this way, currents that counteract the change of the magnetic flux, that is, the magnetic alternating field in the magnetic core 8, are induced in the conductors 5D and 4A according to the Lenz rule. Consequently, there is an approximation of the magnitudes of the partial currents in the conductors 5D and 4A.

According to the same principle, the partial currents in the conductors 4A and 4C, in the conductors 4C and 5B, and also in the conductors 5B and 5D are also approximated to one another, in pairs, as a result of the arrangement according to FIG. 4. By the cyclic arrangement, on the whole, there is also an approximation of all partial currents together, so that the total current is uniformly distributed among the four conductors 4A, 4C, 5B, and 5D. This type of approximation of the partial currents is also provided for with the conductors 5A, 5C, 4B, and 4D of the other current direction. A uniform distribution of the partial currents is of interest both with regard to the compensation of the magnetic fields and also with regard to the current load of the individual conductors.

In the above, the use of the invention on the secondary side of a device for the inductive transmission of electrical energy from a charging station to an electric vehicle was described by way of example. As the specialist in the art can immediately see, the invention can very generally be used with the connection between a coil and a power electronic unit, that is, just as well on the primary side of an inductive transmission device in which only the direction of the power flow between the primary coil and the power electronic unit there is reversed, in comparison to the secondary side. Furthermore, variation possibilities for the implementation of the invention can be deduced by a specialist in the art from the embodiment example described. Thus, in particular depending on the available cross-sectional area of channel 7, more than two cables could be used, and the number of the conductors per cable could also be, instead of four, only two or more than four. Those and comparable modifications are up to the specialist in the art and should be included by the patent claims.

The invention claimed is:

1. A device for inductive transmission of electrical energy, the device comprising:
   a coil arranged to be coupled inductively with another coil by positioning the two coils relative to one another for transmission of electrical energy;
   a power electronic unit, the power electronic unit arranged for drawing electrical power from the coil or for output of electrical power to the coil; and
   a feedline connecting the coil to the power electronic unit, the feedline including at least two multi-conductor cables having conductors insulated from one another;
   wherein a connection of each terminal of the coil to a respective terminal of the power electronic unit includes a plurality of conductors of the multi-conductor cables; and
   wherein each terminal of the coil is connected to the respective terminal of the power electronic unit by conductors of at least two different multi-conductor cables.

2. The device according to claim 1, wherein each of the two terminals of the coil is connected to a respective terminal of the power electronic unit by a same number of conductors of each individual multi-conductor cable.

3. The device according to claim 1, wherein, in a cross section of each multi-conductor cable, the conductors are symmetrically arranged and assigned to the terminals of the coil.

4. The device according to claim 3, wherein conductors having a same current direction are arranged in pairs and symmetrical to a center of a multi-conductor cable and conductors having current directions opposite to one another alternate in a circumferential direction on each circle defined by a center of a multi-conductor cable and centers of two conductors which are arranged symmetrical to one another.

5. The device according to claim 1, wherein all conductors of a multi-conductor cable that connect a terminal of the coil to a same terminal of the power electronic unit for uniform distribution of total current are arranged to pass cyclically and in pairs of individual conductors with current directions opposite to one another though closed magnetic cores.

6. The device according to claim 1, wherein a total cross section of each of the multi-conductor cables does not exceed design height of the coil.

7. The device according to claim 1, wherein the coil is a secondary coil installed in a vehicle and arranged for power input.

8. The device according to claim 1, wherein the coil is a primary coil installed in a stationary unit and arranged for power output.

* * * * *